(12) United States Patent
Walker

(10) Patent No.: US 11,600,998 B2
(45) Date of Patent: Mar. 7, 2023

(54) ELECTRONIC DEVICE CHARGER

(71) Applicant: Anthony Walker, Bowie, MD (US)

(72) Inventor: Anthony Walker, Bowie, MD (US)

( * ) Notice: Subject to any disclaimer, the term of this patent is extended or adjusted under 35 U.S.C. 154(b) by 258 days.

(21) Appl. No.: 16/842,993

(22) Filed: Apr. 8, 2020

(65) Prior Publication Data

US 2020/0328603 A1    Oct. 15, 2020

Related U.S. Application Data

(60) Provisional application No. 62/832,998, filed on Apr. 12, 2019.

(51) Int. Cl.
| | |
|---|---|
| *H02J 7/00* | (2006.01) |
| *H01R 13/642* | (2006.01) |
| *H01R 13/72* | (2006.01) |
| *H01R 31/06* | (2006.01) |

(52) U.S. Cl.
CPC .......... *H02J 7/0042* (2013.01); *H01R 13/642* (2013.01); *H01R 13/72* (2013.01); *H01R 31/06* (2013.01); *H02J 7/0047* (2013.01)

(58) Field of Classification Search
CPC ...... H01R 35/025; H01R 13/72; H01R 33/92; H01R 31/02; H01R 31/06; H01R 13/642; H02J 7/0042; H02J 7/0047
USPC ................................ 439/131, 501, 639, 640
See application file for complete search history.

(56) References Cited

U.S. PATENT DOCUMENTS

| | | | | |
|---|---|---|---|---|
| 5,829,993 | A * | 11/1998 | Wu ...................... | H05K 5/0247 439/131 |
| 6,790,062 | B1 * | 9/2004 | Liao ...................... | H01R 13/72 439/501 |
| 6,994,592 | B1 * | 2/2006 | Gannon ............... | H01R 31/065 439/669 |
| 7,040,923 | B1 * | 5/2006 | Min-Chen .............. | H01R 35/02 439/669 |
| 7,549,877 | B1 * | 6/2009 | Vista, Jr. ................ | H01R 27/00 439/640 |
| 8,712,486 | B2 * | 4/2014 | Sorias ................... | H04M 19/08 439/131 |
| 8,801,441 | B2 * | 8/2014 | Zhang .................. | H01R 13/633 439/131 |
| 9,130,384 | B2 | 9/2015 | Pliner et al. | |
| 9,544,005 | B2 * | 1/2017 | Wei ....................... | H02J 7/0048 |
| 9,977,462 | B2 * | 5/2018 | Sorias ...................... | H02J 7/02 |

(Continued)

FOREIGN PATENT DOCUMENTS

| | | |
|---|---|---|
| WO | 2015075724 A1 | 5/2015 |
| WO | 2016021826 A1 | 2/2016 |

*Primary Examiner* — Gary F Paumen
(74) *Attorney, Agent, or Firm* — TheLawFirmof Andrea HenceEvans; Andrea Evans

(57) ABSTRACT

Disclosed herein is a mobile device charger. A mobile device charger, comprising a housing having a connector to a mobile device; an inner cavity configured to house one or more extensions, wherein the one or more power connectors are at least: a male USB connector, a male outlet plug connector, or a male cigarette lighter connector. The housing can comprise a cover, wherein the cover is configured to conceal the inner cavity of the housing. The mobile device charger is configured to have a retracted position and an extended configuration for the power connectors. The mobile device charger further comprising an extender fixture to secure the mobile device.

18 Claims, 10 Drawing Sheets

(56) References Cited

U.S. PATENT DOCUMENTS

| | | | |
|---|---|---|---|
| 2005/0272287 A1* | 12/2005 | Chang | H01R 13/60 439/131 |
| 2009/0191735 A1* | 7/2009 | Lin | H01R 13/72 439/131 |
| 2011/0215759 A1* | 9/2011 | Lee | G06F 1/266 439/501 |
| 2013/0078832 A1* | 3/2013 | Vardanyan | H01R 27/00 439/131 |
| 2013/0217265 A1* | 8/2013 | Schlaepfer | H01R 29/00 439/639 |
| 2014/0253038 A1 | 9/2014 | Posa | |
| 2015/0364875 A1* | 12/2015 | Ginsberg | H02J 7/0042 320/137 |
| 2016/0197431 A1* | 7/2016 | Hsu | H01R 31/065 439/131 |

\* cited by examiner

ELECTRONIC DEVICE CHARGER

RELATED APPLICATIONS

This application claim priority to U.S. Provisional Patent Application No. 62/832,998, filed on Apr. 12, 2019, the contents of which is incorporated herein by reference in its entirety.

FIELD OF DISCLOSURE

The present disclosure relates at least to a charger, and more specifically, a charging device having multiple power connectors.

BACKGROUND

In some situations, charging a mobile or any portable electronic device is made inconvenient due to a lack of available outlet options. For example, a user of the mobile device may be travelling in a vehicle but lack the appropriate connector to charge the mobile device in the vehicle. In other instances, a user may be inside a building but not have the proper connector to charge the mobile device in a wall outlet. Thus, the conventional strategy is to purchase additional ad-hoc connectors. This often causes problems because the conventional strategy does not provide for a comprehensive and efficient way to address the problem. For example, cords and connectors may be misplaced. In other instances, cords and connectors may be bent, broken, or otherwise ineffective.

Accordingly, there remains a need for improved comprehensive and efficient way to address the problem. This need and other needs are satisfied by the various aspects of the present disclosure.

SUMMARY

Some or all of the above needs and problems may be addressed by certain embodiments of the disclosure. In accordance with the purposes of the disclosure, as embodied and broadly described herein, the disclosure, in one aspect, relates to a user device charger. User devices can include cell phones, smart phones, tablets, and the like. An embodiment of the charging device can include a housing. The housing can include one or more power connectors. The housing can be configured to encompass the one or more power connectors. The charger can also include an extender. The extender can comprise a charging connector configured to couple to a user device. The extender can be coupled to the housing via a power cord. The power cord provides the electrical communication between the power source and the electrical device.

In another embodiment of the disclosure, an embodiment of the charging device can include a housing. The housing can include one or more power connectors. The housing can be configured to encompass one or more power connectors. The charger can also include an extender. The extender can comprise a charging connector configured to couple to a user device. The extender is coupled to the housing via a power cord. The charging device can further comprise an extender fixture coupled to the extender and configured to hold a user device. The power cord provides the electrical communication between the power source and the electrical device.

Another embodiment for the disclosure is a method of charging a user device. The method can include providing a charging device comprising a housing, one or more power connectors. The housing can be configured to house one or more power connectors, a extender comprising a charging connector configured to couple to a user device, wherein the extender is coupled to the housing via an power cord and in electrical communication with the one or more power connectors; and a extender fixture coupled to the extender configured to hold a user device. The method can include connecting at least one of the one or more power connectors to a power source. The method can also include coupling the charging device to the user device via the extender fixture and extender.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several aspects of the disclosure and together with the description, serve to explain the principles of the disclosure.

DETAILED DESCRIPTION

Figure 1:
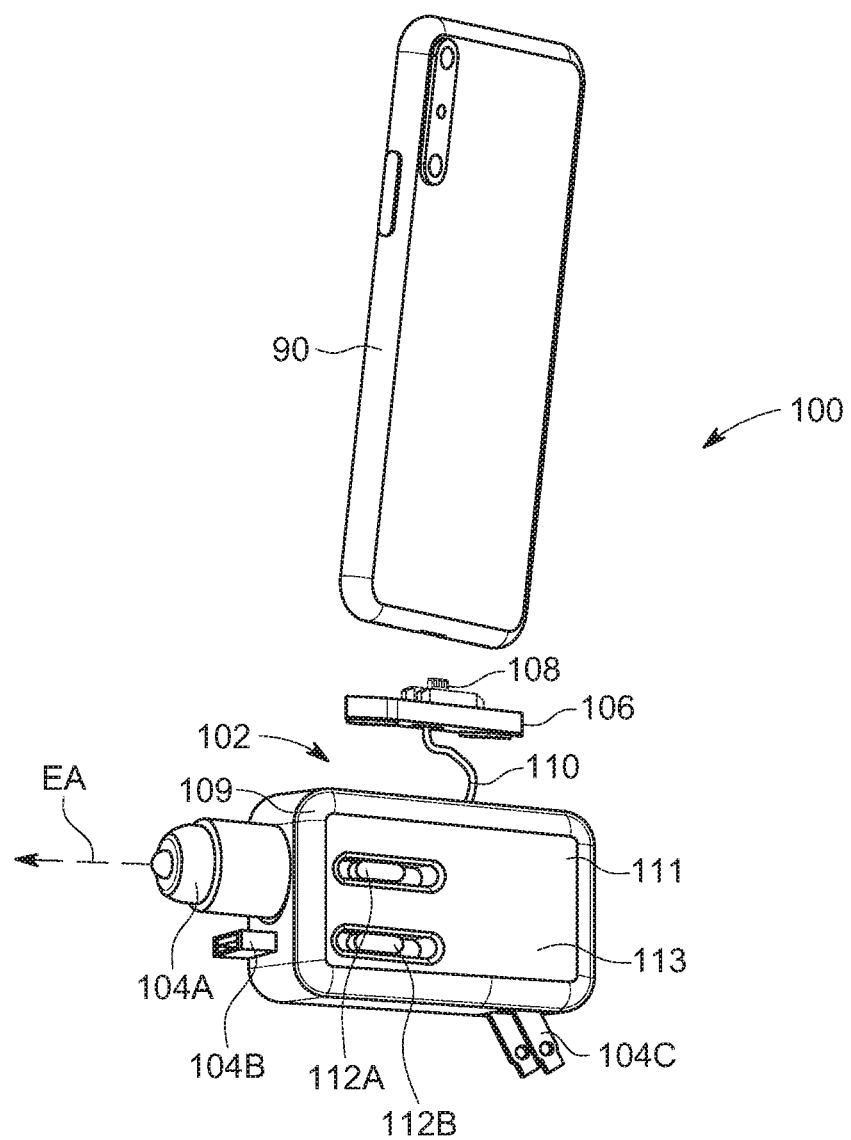
FIG. 1 depicts a rear isometric view of a mobile device charger with all extensions exposed in accordance with an exemplary embodiment of the present disclosure.

The present disclosure can be understood more readily by reference to the following detailed description of the disclosure and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods, and materials are now described.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the disclosure. Thus, if there are a variety of additional steps that can be performed it is understood that each of these additional steps can be performed with any specific aspect or combination of aspects of the methods of the disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

DETAILED DESCRIPTION

As briefly described above, the present disclosure relates, in various aspects, to a electronic device charger. In further aspects, the present disclosure relates to a method for charging an electronic device such as a mobile device. In still further aspects, the present disclosure relates to a system for charging a mobile device.

As shown in FIG. 1, the charging device 100 can comprise a housing 102. The housing 102 can be configured to have an exterior geometric shape to define an interior cavity (not shown). As shown in FIG. 1, the exterior geometric shape can resemble a rectangular prism. It is further considered that other geometric shapes are possible to allow alternative for variations in the volume of the interior cavity. Variations exterior geometric shape for the housing can also allow for variable power connectors 104A-C coupled and stored in the housing 102. In another aspect, the housing 102 can include a cover 111.

The cover 111 can be piece of plastic, metal, or combination of materials that may be configured to encompass the exterior surface 109 of the housing 102. In one aspect, the cover 111 can allow the user to gain access to the interior cavity of the housing 102. For example, a user may open and close the cover by either pulling a portion of the cover 111 to reveal the interior of the housing 102. In a further aspect, the cover can be secured to the housing 102 by a latch mechanism or snap-fit coupling that secures two portions of a cover together. In another aspect, cover 111 can be secured to the housing 102 magnetically. The magnetic cover can comprise magnetic attachments that mate a first portion and second portion of the cover 111. In another aspect, a magnetic portion of cover 111 can be directly attachable to a magnetized portion of the housing 102. In a further aspect, the cover 111 (or housing 102) can comprise a pattern 113. The pattern can be oriented on the surface of the cover, wherein the pattern provides an increased tactile grip for a user.

The housing 102 can encompass multiple power connectors 104A-C. The power connectors 104A-C can extend from the exterior surface 109 of the housing and the cover 111. The power connectors 104a-c can include one or more power connectors comprising, a cigarette lighter connector 104A, a USB connector 104 B, and an AC outlet connector 104C.

The first type of power connector can be a cigarette lighter power connector 104A. The cigarette lighter power connector 104A can be a shaft dimensioned to fit into cigarette lighter power outlets. The cigarette lighter power outlets can be located in cars or other powering devices such as remote car starter systems. In a further aspect, cigarette lighter power connector 104A can be configured to be detachable from to housing 102. The detachable configuration of the cigarette lighter power connector 104A allows the user to replace the connector 104A in the event of damage or malfunction. The attachment/detachment mechanism can comprise a snap fit coupling or screw-type engagement that allows the cigarette lighter power connector 104A to be screwed into the housing 102. In another aspect, the detachable mechanism can be a magnetic coupling between the cigarette lighter power connector 104A and the housing 102. For example, a portion of the cigarette lighter outlet may be magnetically coupled to a reciprocal mating portion on an interior surface of the housing 102.

The second type of connector, the USB connector 104B, can be a male-type connector that extends from the surface 109 of the housing 102. In another aspect, the USB power connector 104b can comprise a female type outlet. In this configuration, the female type outlet can receive a supplemental male cable (not shown) for connection to a power source. The third type of power connector can be the AC outlet. The AC outlet connector 104C can be a standard AC outlet plug configured to receive power from standard low-power wall outlets ranging between 110 and 130 volts. In a further aspect, the AC outlet connector 104C can be configured to receive power from wall outlets ranging between 220 to 240 volts, such as in other countries. In yet another aspect, the AC outlet connector 104C is detachable from the housing 102. For example, a portion of the AC outlet may be magnetically coupled to a reciprocal mating portion on the exterior surface 109 of the housing 102.

FIG. 1 depicts a potentially standard configuration of the power connectors 104A-C, extending from the housing 102. In another aspect, each of power connectors 104A-C, can be located on a different surface of the housing relative to each other. The orientation of the power connectors 104A-C on different surfaces can minimize the obstructions and interferences that the power connectors 104A-C can have on each other.

The cigarette lighter power connector 104A and USB connector 104B can each be actuated to extend from a retracted state in the cavity by their own actuator 112A and 112 B, respectively. In one aspect, the actuators 112A-B can comprise a sliding button that moves connectors 104A-B in a direction parallel to an extension axis (EA), extending from the surface 109 of the housing 102. In another aspect, the actuators 112A-B can comprise a bias mechanism (e.g. being spring loaded), wherein pressing the actuators 112A-B releases connectors 104A-B from a retracted state, allowing the connector 104 to extend. In yet another aspect, the AC outlet power connector 104C can be extended from a retracted state by a third actuator (not shown).

The housing 102 can be coupled to an extender 106. The extender 106 can be a platform shaped device used to physically couple the charging device 100 to a user device 90. The extender 106 can include a charging connector 108. The charging connector 108 can be a protrusion that extends from a surface of the extender 106. The charging connector 108 can be entered into an electrical receptacle of the user device 90 to complete the electrical circuit connection between user device 100 and a power source. The extender 106 can be coupled to the housing 102 by a power cord 110. The power cord 110 can serve as the electrical conduit between the power supplied by the power connectors 104 to the charging connector 108.

Figure 2A:
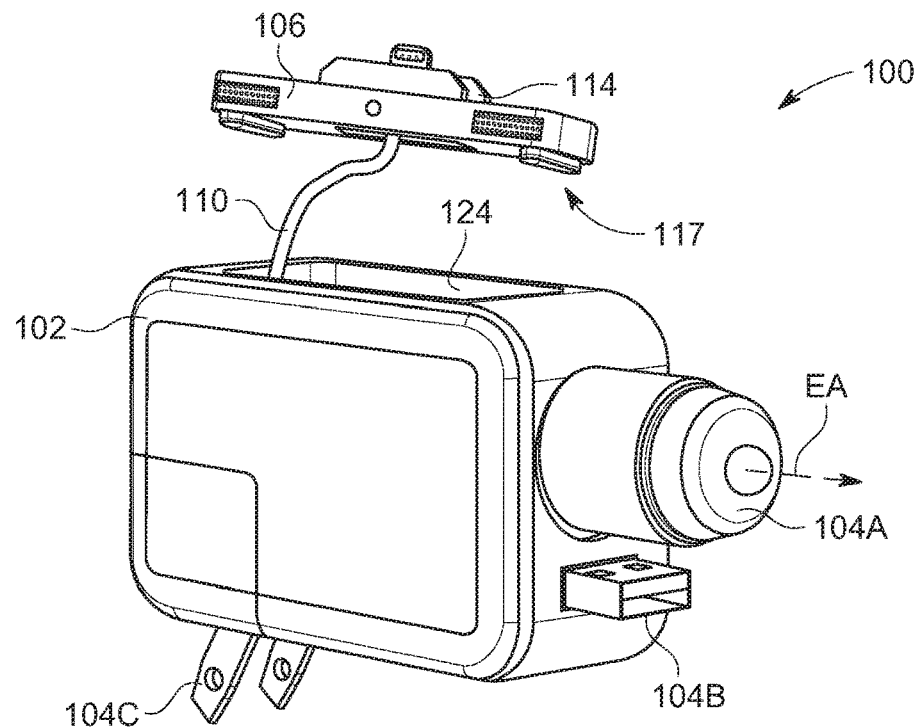
FIG. 2A depicts a front isometric view of the charger depicted in FIG. 1.
Figure 2B:
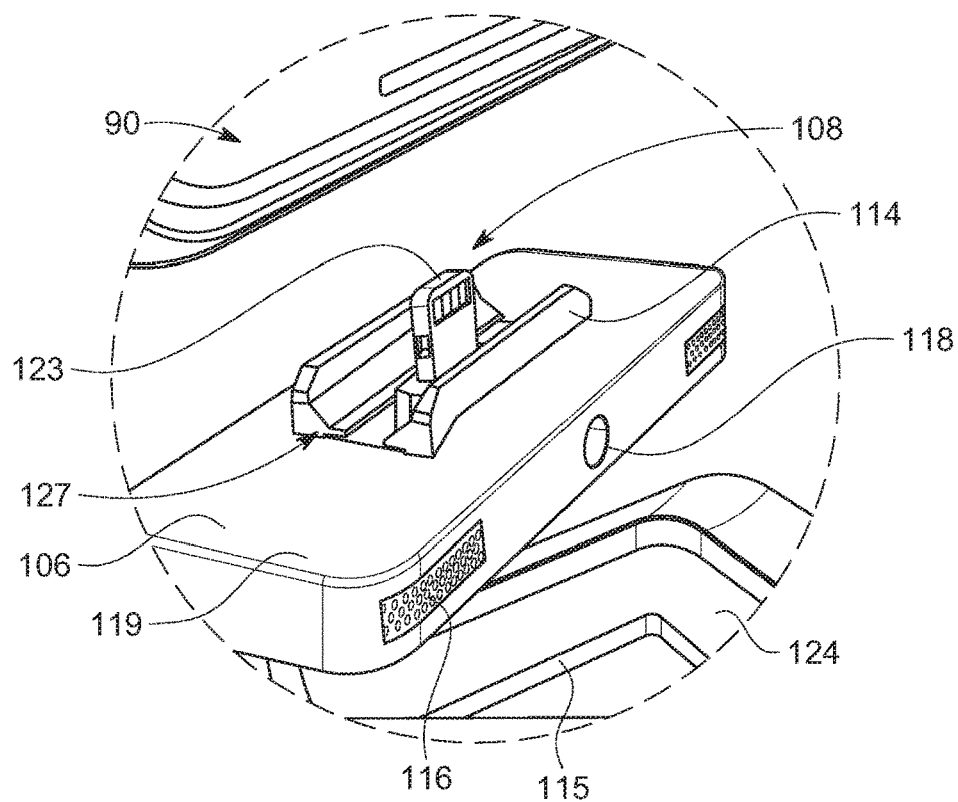
FIG. 2B shows an isometric zoomed view of the charger depicted in 2A.
Figure 2C:
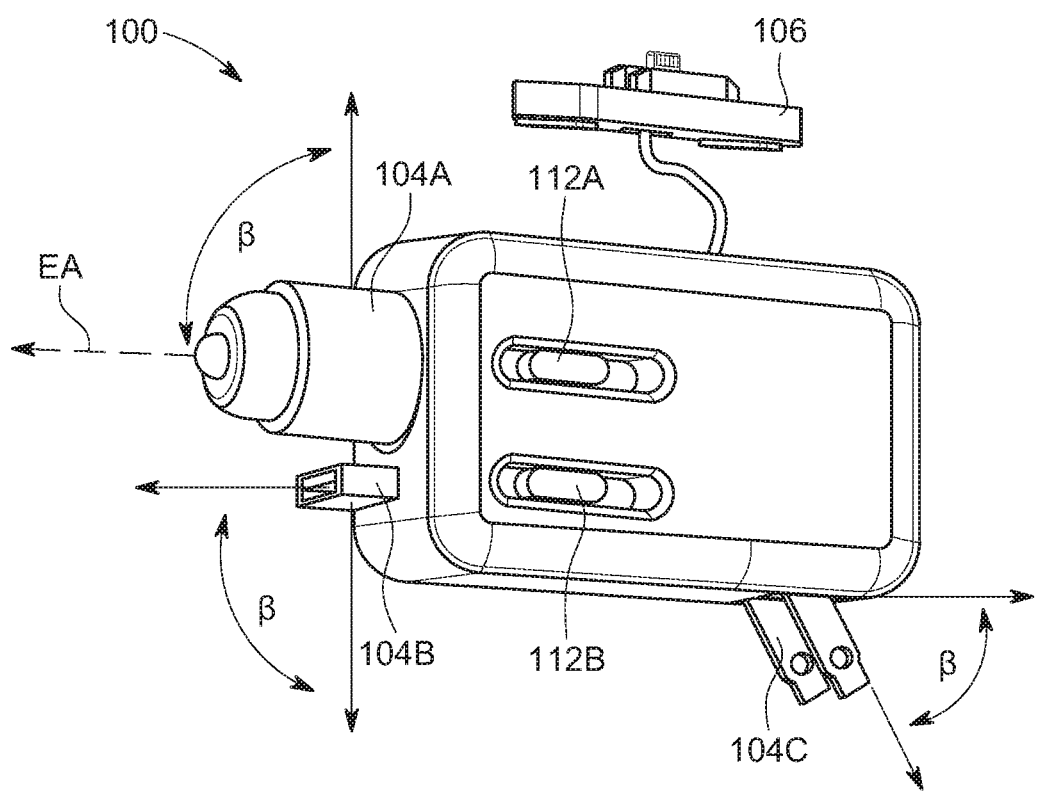
FIG. 2C shows a rear isometric view of the charger depicted in FIG. 1.
Figure 3A:
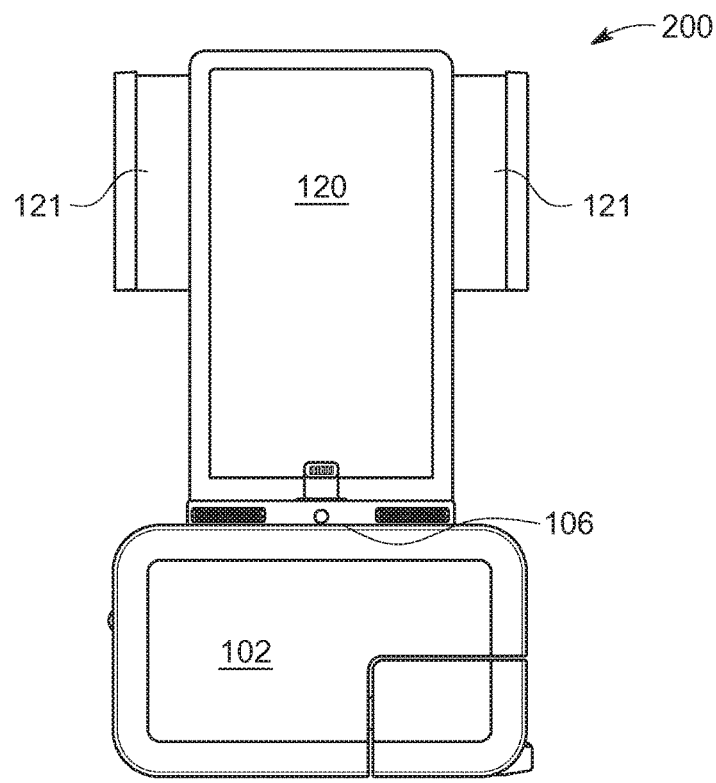
FIG. 3A depicts a front view of a second embodiment of the charging device.
Figure 3B:
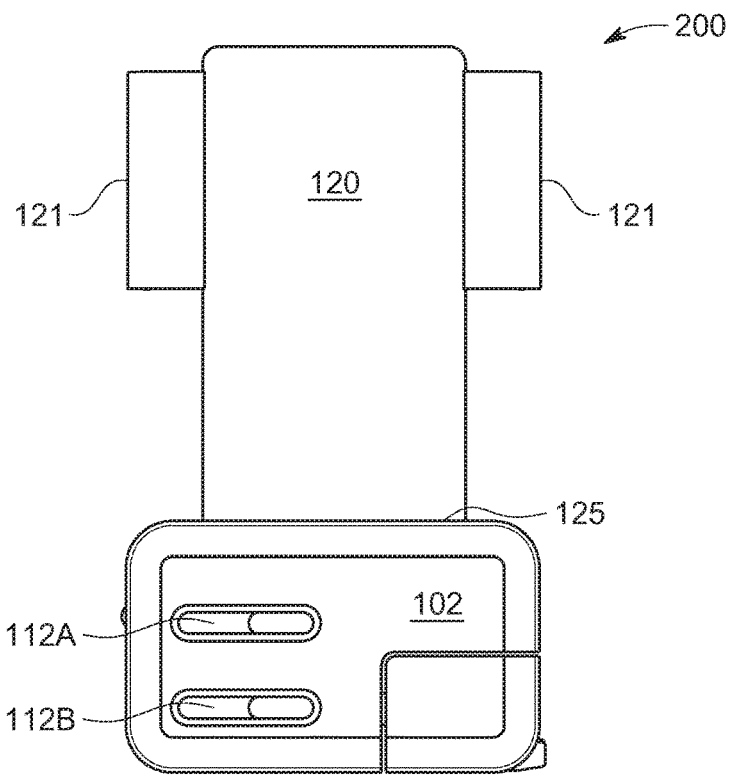
FIG. 3B depicts a rear view of the second embodiment of the charging device.
Figure 3C:
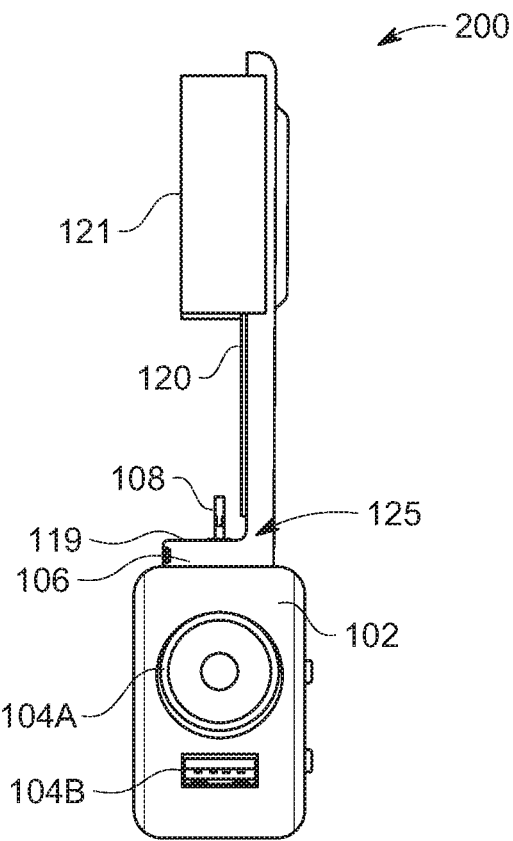
FIG. 3C is a side view of the charging device.
Figure 3D:
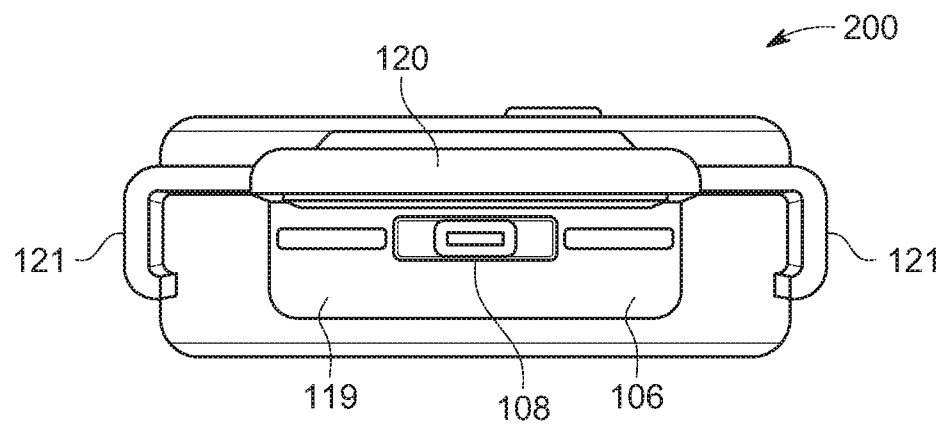
FIG. 3D is a top view of the second embodiment of the charging device.
Figure 3E:
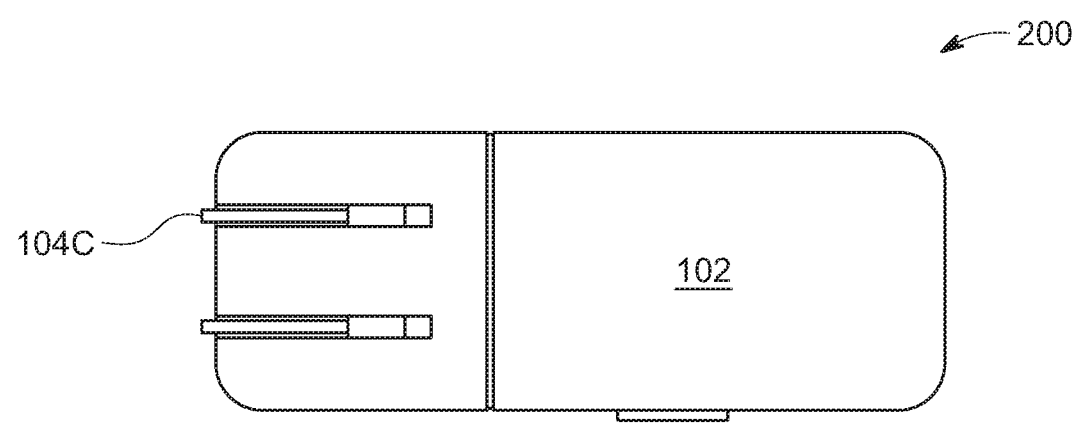
FIG. 3E is a bottom view of the second embodiment.

As shown in FIGS. 2A-2C, the extender 106 can be disengaged from the housing 106. Disengaging the extender 106 from the housing provides the user with additional functionality in making an electrical connection between a user device 90 and a power source, via the charging device 100. Obstructions and interferences to charging can be mitigated because of the degree of freedom allowed by the power cord 110 connecting the extender 106 to the housing 102. The engagement and disengagement between the housing 102 and extender 106 can be secured by an attachment mechanism between the housing and extender. For example, a bottom surface 117 of the extender 106 can be dimensioned to come to rest in an indention 124 of the housing, when the power cord 110 is retracted into the housing. In a further aspect, the extender 106, when coupled to the housing 102, can be held in place by a locking mechanism or magnetic coupling between an exterior surface of the extender 106 and the exterior surface of housing 102.

The extender 106 can also comprise connecting clamps 114. The connecting clamps can be members that extend from a top surface 119 of the extender 106. The connecting clamps 114 can be oriented to aid in alignment of the user device 90, ensuring a stronger physical coupling and electrical connection between the charging device 100 and the user device 90. In a further aspect, the connecting clamps 114 can be biased to increase a compressive holding force on the user device 90. The connecting clamps 114 can be biased to rotate or slide towards the charging connector 108. For example, a spring can be oriented at an interface 127 between the connecting clamps 114 and the top surface of the extender 106 to induce the biased orientation of the connecting clamps. Accordingly, when the charging connector 108 is coupled to the phone 90, the phone can cause the connecting clamps 114 to rotate or slide outwardly away from the charging connector 108, which increases the potential energy of the biased spring and also increases the compressive force of the connecting clamps on the phone 90.

The charging connector 108 can extend from a top surface 119 of the extender 106. The charging connector 108 can be configured to make the electrical connection between the charging device 100 and a user device 90. The charging connector 108 can be configured to interface multiple types of user devices. In one aspect, the charging connector 108 can be detachable from the extender. For example, if the user has a first user device compatible with Apple® electronics (e.g. Lightning Cable connector) and a second user device compatible with Samsung® electronics (e.g. micro SB connector), the detachable charging connector 108 allows the user to determine which connector interface 123 is compatible for their phone. In one aspect, the attachment mechanism for the charging connector 108 and extender 106 can be a magnetic plug. In the magnetic plug, a first magnet can be coupled to a bottom surface of the charging connector 108 and second magnet can be place on an indented top surface 119 of the extender 106. The magnetic plug can secure the charging connector 108 to the extender 106, while also maintaining the electrical conduit to the power cord 110.

The extender 106 can be connected to the housing 102 via a power cord 110. The power cord 110 can serve as the electrical conduit between the power connectors 104A-C in the housing 102 to the charging connector 108 in the extender 106. The cord 110 can extend from the cavity of the housing 102 through an orifice 115 on the surface 109 of the housing, connecting to a portion of the extender 106. The power cord 110 can be retracted into the cavity of the housing 102.

In one aspect, the power cord 110 can comprise a coiled configuration. The coiled orientation allows the power cord to more suitably fit in the cavity of the housing. In another aspect, the housing 102 can include a biased spool. When the user wants to retract the length of the power cord, the user can pull on the cable. The pulling motion can release the potential energy stored in the spool; causing the spool to rotate, resulting in a winding of the power cord 110 around the spool.

The charging device 100 can also comprise a communication system 116. In one aspect the communication system 116 is a component of the extender 106. The communication system 116 can include a microphone and a speaker. The communication system 116 can allow a user to hold conversation or enjoy an external auditory activity while the user device 90 is being charged. In another aspect, the communication system 116 can be integrated into the housing 102 of the charging device 100. The communication system 116 can also include an antennae for near field communication and/or Bluetooth® capabilities to maintain communication with the charging user device or other user devices, such as smartphones, tablets, personal computers, or the like.

The charging device 100 can include a charging indicator 118. The charging indicator 118 can be in the form of a light emitting diode (LED) and/or a separate audio sequence associated with the communication system 116. The charging indicator 118 can provide information to the user that an electrical connection has been sustained between the power connectors 104 and the charging connector 108. The charging indicator can be located on either or both of the extender 106 and housing 102. The charging indicator 118 can comprise a single LED or plurality of LEDs that illuminate a certain color relative to the connection and/or charging status. For example, the LED may provide a green light indicating an appropriate connection, while a red light can indicate a faulty connection. A faulty connection indication can be a fail-safe measure to determine whether one of the power connectors 104 is malfunctioning. Another aspect, the charging indicator can also include an initial beep or chirp to indicate that an electrical connection has been made. The auditory component may have functionality for the visually-impaired who may not be able to sense an illuminated LED.

FIG. 2C depicts an alternative aspect of the charging device 100. In one aspect, the power connectors 104A-C can be configured to extend perpendicularly from the housing, shown in FIG. 1. The power connects could be extended by the actuators 112A-112B. In the alternative aspect shown in FIG. 2C, the power connectors 104A-C can be configured to extend from the surfaces at varying angles β. The ability to vary the angles 3 for the power connectors 104A-C provides the user with additional flexibility in connecting the charging device to the power source due to potential obstructions at or near the power source. To accommodate the rotation of the angle β, the housing can have orifices on the external surface, so that the rotation of the extended power connector 104A-C is not obstructed by the housing itself.

In a further aspect, the charging device 100 can also include a wireless charging mat. The charging device 100 can receive energy through the power connectors 104 and transfer the energy to the user device 90 by induction via the wireless charging mat. For example, the charging mat can integrated into an exterior surface of the housing 102 or the cover 111. In another aspect, the charging device 100 can have a battery configured to receive energy from the connectors and store auxiliary power for the charging device 100. In a further aspect, the charging device can include a battery charge indicator to inform the user of the charging status of the battery.

As shown in FIGS. 3A-3E, an alternate embodiment of the charging device 200 can comprise an extender fixture 120. The extender fixture 120 can provide additional stability for the charging device 200. The extender fixture 120 can be coupled to the top surface 119 of the extender 106. The extender fixture 120 can be a member that extends from the top surface 119 of the extender 106. In an aspect, the extender 106 and the extender fixture 120 can be a unitary piece. For example, the extender 106 and the extender fixture 120 can be molded or extruded as a single piece. In another aspect, the extender fixture 120 and extender 106 can be two distinct components that are coupled at a connection juncture 125. The connection juncture 125 can be an attachment mechanism such as a snap fit coupling. The snap-fit coupling can comprise reciprocal mating connectors extending from mating surfaces of the extender 106 and the extender fixture 120 that meet at the connection juncture 125. In a further aspect, the attachment mechanism at the connection juncture 125 can be a magnetic coupling, with mating magnets affixed to mating surfaces of the extender 106 and the extender fixture 120. In yet a further aspect, the snap-fit coupling, and magnetized coupling can be used in combination for a more secure connection.

The extender fixture 120 can also include a clamping bracket 121. The clamping bracket can be used to further secure and stabilize a user device 90 when coupled to the charging connector 108. The clamping bracket 121 can comprise arm members that extend from both sides of the extender fixture 120. The arm members of the clamping bracket 121 can bend and provide compressive engagement points between the extending fixture 120 and phone. The clamping brackets can mitigate the phone from moving side to side.

Figure 4A:
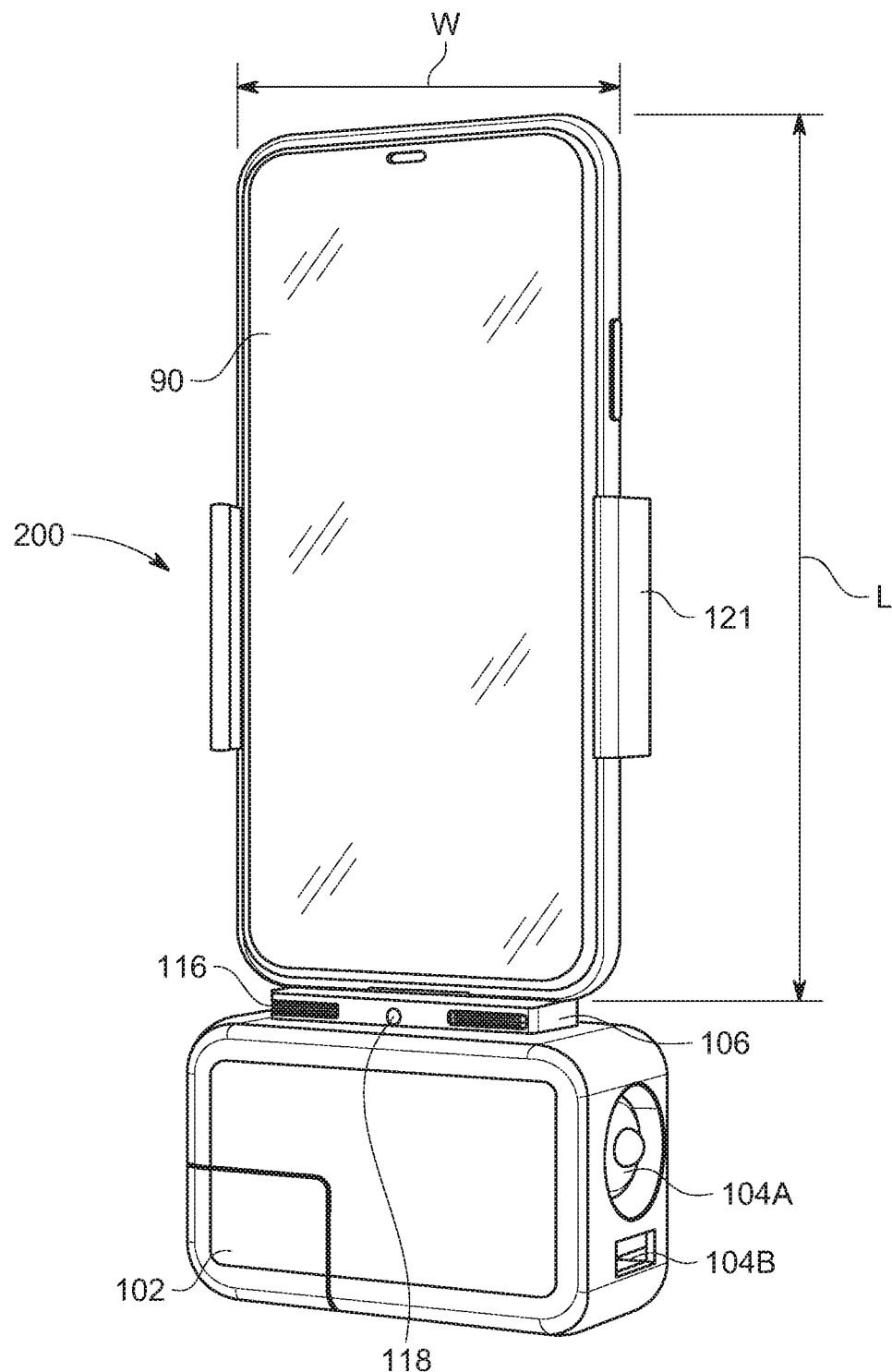
FIG. 4A depicts a front isometric view of the second embodiment in a retracted configuration.
Figure 4B:
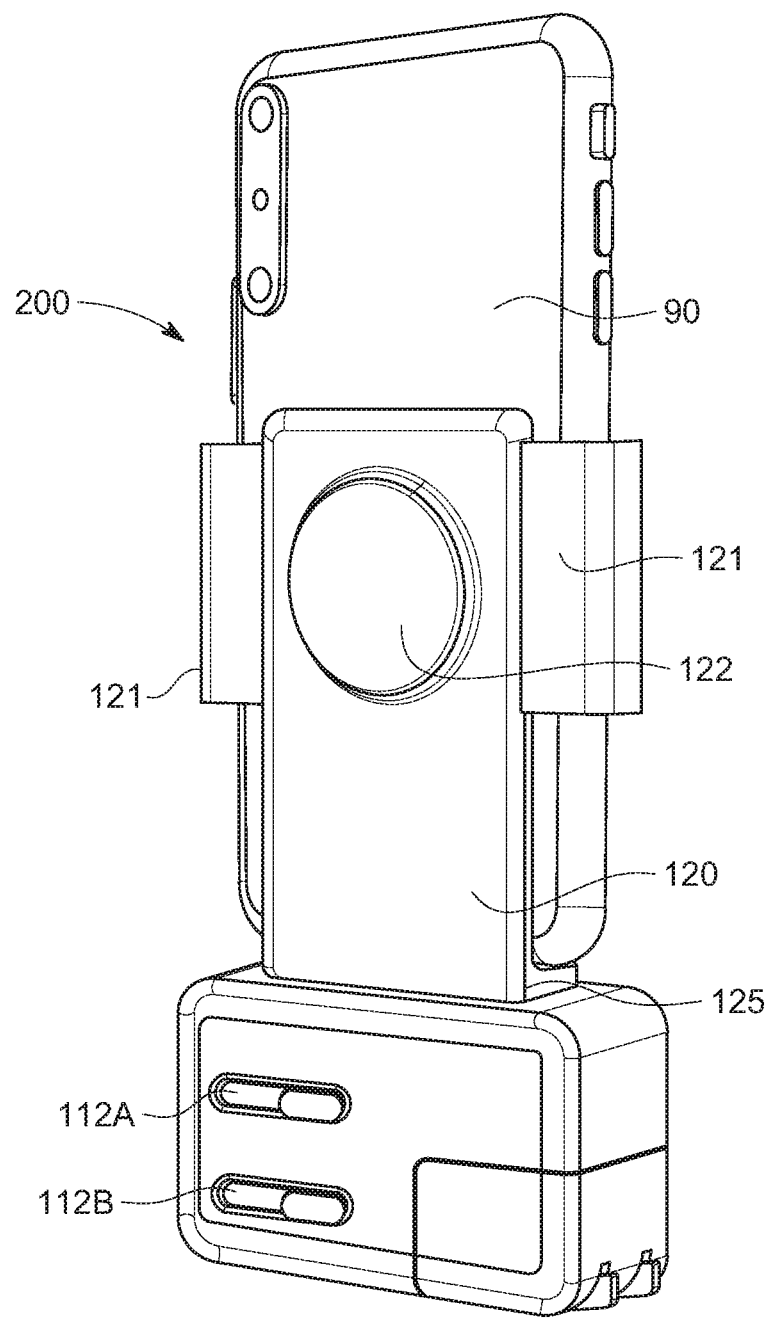
FIG. 4B depicts a rear isometric view of the second embodiment of the charging device in a retracted configuration.

Referring to FIGS. 4A-4B, the extender fixture 120 can have an adjustment mechanism 122. The adjustment mechanism can be configured to move the arms of the clamping bracket 121 so that variable sizes of user devices can be connected to the charging device 200. For example, the adjustment mechanism 122 can be a ratcheting system that causes the clamping brackets 121 to extend or retract along the width (W) of the user device to effectively apply a compression force to the sides of the user device. In a further aspect the extender fixture can have a third clamping bracket that can extend by the adjustment mechanism along the length (L) of the user device. The extender fixture 120 can also comprise a release button. When the release button is actuated, the clamping brackets 121 move away from the surface of the user device, removing the compressive forces.

Figure 5B:
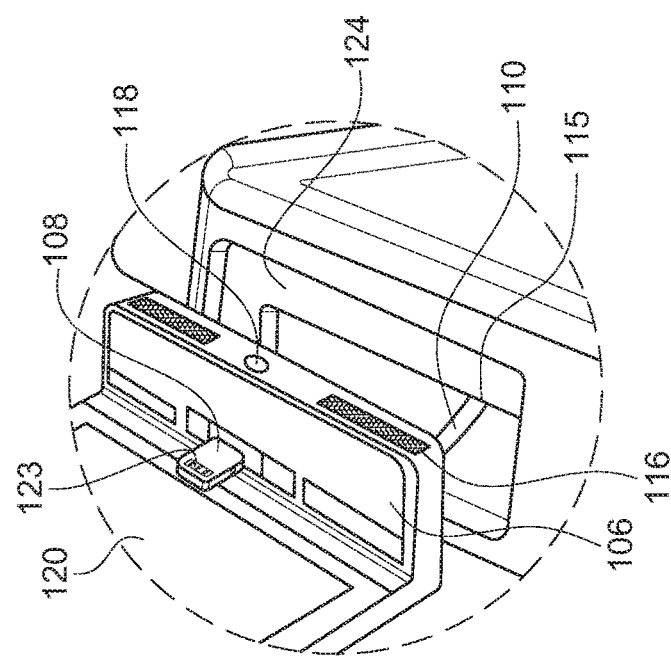
FIG. 5B depicts a zoomed isometric view of rear isometric view of the second embodiment of the charging device in a retracted configuration.
Figure 5A:
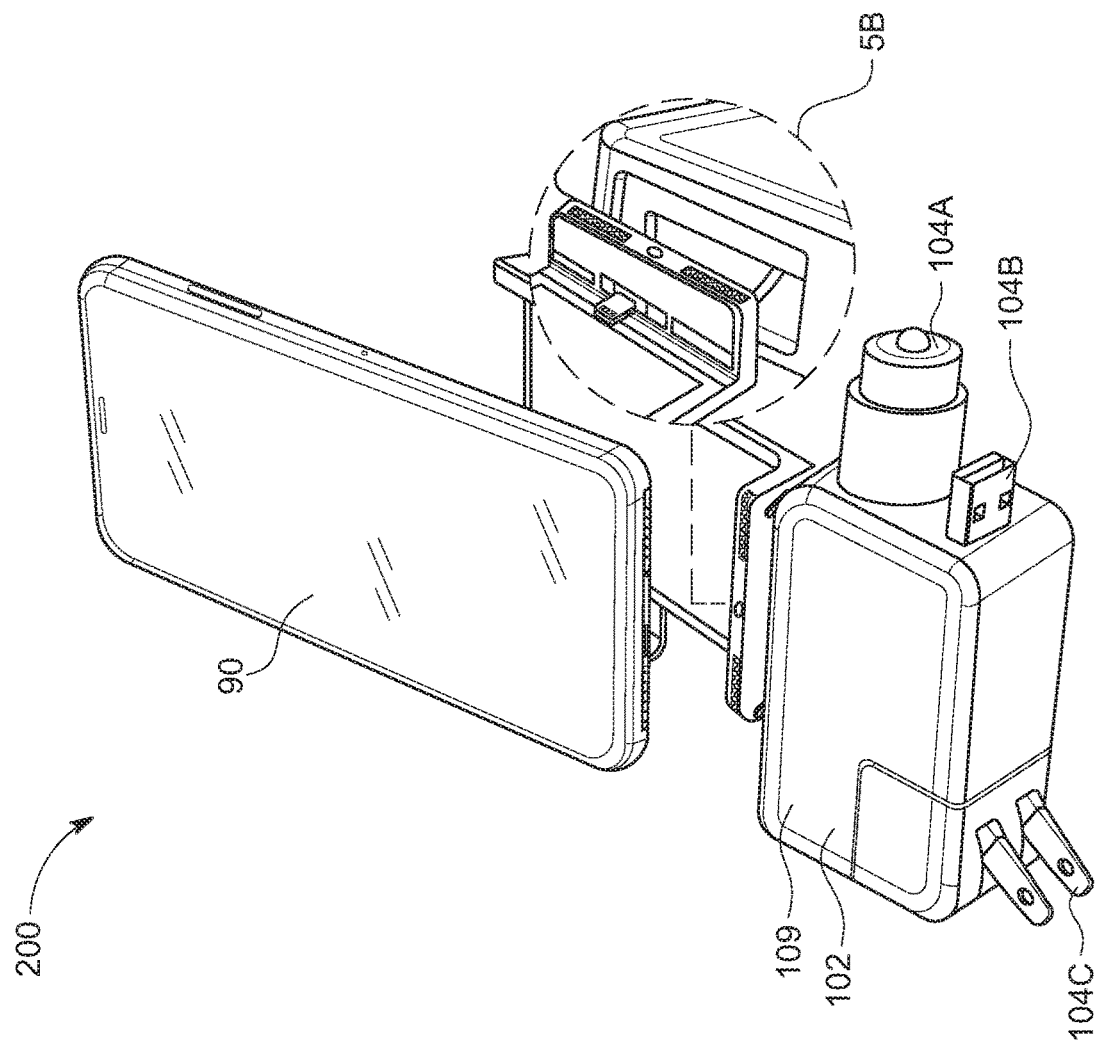
FIG. 5A is an exploded isometric view of the second embodiment in the extended configuration.

FIGS. 5A-B depict an expanded view of the charging device 200 in FIGS. 4A-4B. The cigarette lighter power connector 104A, USB power connector 104B, and the AC outlet connector 104C can be configured to extend from the exterior surface 109 of the housing 102. In another aspect, a charging mat can integrated into the extender fixture 120. Electrical power from a power source can be transferred to the charging connector 108 via the power cord 110. The power cord 110 maintains an electrical connection with the power connectors 104A-104C. The power cord connects to the extender 106 from the housing 102 by traversing an orifice 115 in the surface of the housing 102. The power cord 110 allows the extender to be separated from the housing to provide addition flexibility and convenience in charging the phone. The charging device 200 can also be reengaged by placing the extender 106 in the indention 124 on the surface of the housing 102. The phone 90 can be engaged for charging by coupling the phone at the charging interface 123 on the charging connector 108. To verify the electrical connection between the power source and the phone, the charging indicator 118 can illuminate.

Figure 6:
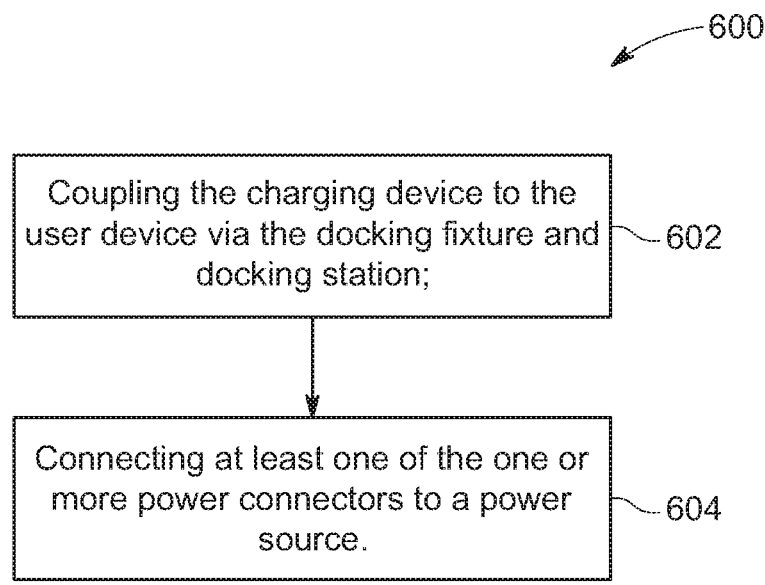
FIG. 6 depicts a block diagram for a method of using the charging device.

As shown in FIG. 6, the method 600 can be represented as a block diagram. The method 600 can initiate at block 602 which comprises coupling the charging device to the user device via the extender fixture and extender. The method 600 can proceed to block 604 which comprises connecting at least one of the one or more power connectors to a power source. Block 604 can include coupling at least one of the cigarette lighter connector, USB connector or AC outlet connectors to a power source. Block 604 can also comprise, making a determination of a single connector for coupling to the power source. In another aspect, Block 604 can comprise extending one of the power connectors from a retracted state inside of the housing.

The Method 600 can further include extending the charging device by decoupling the extender from the housing. In a further aspect, the electrical connection between the extender and the housing can be maintained by a power cord. In a yet a further aspect, the extender can be recoupled to the housing by retracting the power cable into the housing.

The Method 600 can further include implementing an adjustment mechanism on the extender fixture. The adjustment mechanism can engage the sides of the user device to increase the stability of the user device is connected to the charging connector of the user device. In a further aspect, the adjustment mechanism can be disengaged by the actuation of a release button. The release button can cause the adjustment mechanism to release allowing for easier removal of the user device from the charging station.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

What is claimed:

1. A charging device comprising:
a housing;
one or more power connectors, wherein the housing is configured to house the one or more power connectors;
an extender comprising a charging connector configured to couple to a user device, wherein the extender is coupled to the housing via a power cord and in electrical communication with the one or more power connectors; and
wherein the one or more power connectors comprise: a male USB connector, a male outlet plug connector, and a male cigarette lighter connector.

2. The charging device of claim 1 wherein the housing defines an internal cavity, wherein the one or more power connectors are configured to be retracted or extended from the internal cavity.

3. The charging device of claim 2, wherein the one or more power connectors are each selectively retracted or extended from the internal cavity by an actuator.

4. The charging connector of claim 1, wherein the power cord is configured to retract and extend from the housing.

5. The charging connector of claim 1, wherein the extender comprises a clamping bracket configured to secure a coupling between the extender and a user device.

6. The charging device of claim 1, further comprising a charging indicator.

7. The charging device of claim 1, further comprising a communication system.

8. A charging device comprising:
a housing;
one or more power connectors, wherein the housing is configured to house the one or more power connectors;
an extender comprising a charging connector configured to couple to a user device, wherein the extender is coupled to the housing via a power cord and in electrical communication with the one or more power connectors;
an extender fixture coupled to the extender configured to hold a user device; and
wherein the one or more power connectors comprise: a male USB connector, a male outlet plug connector, and a male cigarette lighter connector.

9. The charging device of claim 8 wherein the housing defines an internal cavity, wherein the one or more power connectors are configured to be retracted or extended from the internal cavity.

10. The charging device of claim 9, wherein the one or more power connectors are each selectively retracted or extended from the internal cavity by an actuator.

11. The charging connector of claim 8 wherein the power cord is configured to retract and extend from the housing.

12. The charging connector of claim 8 wherein the extender comprises a clamping bracket configured to secure a coupling between the extender and a user device.

13. The charging connector of claim 12 wherein the extender is configured to couple to the housing on an exterior surface of the housing.

14. The charging device of claim 8, further comprising a primary charging indicator.

15. The charging device of claim 8, comprising a communication system.

16. The charging device of claim 8, wherein the extender fixture comprises an adjustment device configured to adjust the dimensions of the extender fixture.

17. A method for operating a charging device comprising:
a housing,
one or more power connectors,
wherein the housing is configured to house one or more power connectors,
wherein the one or more power connectors comprise: a male USB connector, a male outlet plug connector, and a male cigarette lighter connector:
an extender comprising a charging connector configured to couple to a user device, wherein the extender is coupled to the housing via an power cord and in electrical communication with the one or more power connectors; and
an extender fixture coupled to the extender configured to hold a user device, the method comprising:
connecting at least one of the one or more power connectors to a power source; and
coupling the charging device to the user device via the extender fixture and extender.

18. The method of claim 17 further comprising determining that an electrical connection exists between the power source and the user device via a charging indicator on the charging device.

* * * * *